(12) United States Patent
Tanaka et al.

(10) Patent No.: US 10,516,311 B2
(45) Date of Patent: Dec. 24, 2019

(54) AXIAL GAP MOTOR AND METHOD FOR MANUFACTURING WINDING THEREFOR

(71) Applicant: Hitachi Industrial Equipment Systems Co., Ltd., Chiyoda-ku, Tokyo (JP)

(72) Inventors: Yuichiro Tanaka, Tokyo (JP); Hiroshi Ichige, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 809 days.

(21) Appl. No.: 14/903,233

(22) PCT Filed: Jul. 26, 2013

(86) PCT No.: PCT/JP2013/070387
§ 371 (c)(1),
(2) Date: Jan. 6, 2016

(87) PCT Pub. No.: WO2015/011836
PCT Pub. Date: Jan. 29, 2015

(65) Prior Publication Data
US 2016/0149453 A1  May 26, 2016

(51) Int. Cl.
*H02K 3/28* (2006.01)
*H02K 3/38* (2006.01)
(Continued)

(52) U.S. Cl.
CPC ............ *H02K 3/28* (2013.01); *H02K 1/2793* (2013.01); *H02K 3/38* (2013.01); *H02K 15/045* (2013.01); *H02K 1/148* (2013.01)

(58) Field of Classification Search
CPC ...... H02K 1/2793; H02K 21/24; H02K 1/148; H02K 37/125; H02K 3/28; H02K 3/38;
(Continued)

(56) References Cited

U.S. PATENT DOCUMENTS

| 7,567,010 B1* | 7/2009 | Farnia | H02K 1/148 310/216.067 |
| 2004/0164641 A1* | 8/2004 | Yamada | H02K 1/148 310/216.105 |

(Continued)

FOREIGN PATENT DOCUMENTS

| CN | 1819409 A | 8/2006 |
| JP | 56-12845 A | 2/1981 |

(Continued)

OTHER PUBLICATIONS

KR-20080095953-A (English Translation) (Year: 2008).*
(Continued)

*Primary Examiner* — Mang Tin Bik Lian
*Assistant Examiner* — Alexander Moraza
(74) *Attorney, Agent, or Firm* — Crowell & Moring LLP (57) ABSTRACT

Provided are an axial gap motor and a method for manufacturing a winding therefore capable of realizing low cost and high output without causing a jumper wire of a continuously wound coil obtained by winding an insulated conductor wire to protrude from the coil. The axial gap motor comprises a stator which is obtained by disposing a plurality of coils in a ring shape, and a rotor which is rotatably attached so as to face one or both principal surfaces of the stator and includes a plurality of permanent magnets corresponding to the plurality of coils of the stator. Each of the plurality of coils constituting the stator is formed by continuously winding one or more insulated conductor wires as coil wires around two or more separation cores. A core lamination thickness is indicated by "L1'" and a radial length of each coil is indicated by "L2", a relation of L2<L1' is satisfied. In each coil, a length of a jumper wire of the insulated conductor wire continuously wound on the two or (Continued)

more separation cores is equal to the radial length "L2" of the coil.

4 Claims, 8 Drawing Sheets

(51) Int. Cl.
  *H02K 15/04* (2006.01)
  *H02K 1/27* (2006.01)
  *H02K 1/14* (2006.01)
(58) Field of Classification Search
  CPC .. H02K 3/50; H02K 3/52; H02K 3/04; H02K 15/04; H02K 15/045
  USPC ...... 310/156.32–156.37, 179, 194, 198, 208, 310/214
  See application file for complete search history.

(56) References Cited

U.S. PATENT DOCUMENTS

| 2005/0116572 | A1* | 6/2005 | Fukasaku | H02K 3/12 |
| | | | | 310/207 |
| 2006/0163964 | A1 | 7/2006 | Kojima et al. | |
| 2013/0270951 | A1* | 10/2013 | Semmer | H02K 1/17 |
| | | | | 310/154.11 |

FOREIGN PATENT DOCUMENTS

| JP | 2004-72921 A | | 3/2004 |
| JP | 2006-191757 A | | 7/2006 |
| JP | 2006191757 A | * | 7/2006 |
| JP | 2006-230179 A | | 8/2006 |
| JP | 2008-172859 A | | 7/2008 |
| JP | 2011-83190 A | | 4/2011 |
| KR | 20080095953 A | * | 10/2008 |

OTHER PUBLICATIONS

JP-2006191757-A (English Translation) (Year: 2006).*
Chinese Office Action issued in counterpart Chinese Application No. 201380078103.3 dated Apr. 27, 2017 with English-language translation (eighteen (18) pages).
International Search Report (PCT/ISA/210) issued in counterpart International Application No. PCT/JP2013/070387 dated Sep. 3, 2013, with English translation (Four (4) pages).

* cited by examiner

AXIAL GAP MOTOR AND METHOD FOR MANUFACTURING WINDING THEREFOR

TECHNICAL FIELD

The present invention relates to a rotation electrical machine such as a motor or a generator, and particularly, to an axial gap motor and a method for manufacturing a winding thereof.

BACKGROUND ART

In recent years, global warming becomes a severe problem, and hence a demand for saving the energy of electrical appliances increases. Since nowadays about 55% of a domestic annual energy consumption amount is consumed by motors, the concern for increasing the efficiency of the motor is high. In order to improve the efficiency of the motor, a design of using a rare earth magnet having a high energy product has been employed so far.

However, Nd (Neodymium) or Dy (Dysprosium) as a material of the rare earth magnet recently rises in price due to the export ceiling regulation of China as the greatest production country. The policy of the export ceiling regulation of China is determined to prevent the environmental destruction caused by the mining of Nd or Dy. Thus, there is a high possibility that the rare earth material rises in price or the supply shortage thereof occurs even in the future.

For this reason, as a method of improving the efficiency of the motor only by a ferrite magnet without using the rare earth magnet, an axial gap motor has gained attention. Since the axial gap motor can obtain a wide magnet area compared with an existing radial gap motor, it is possible to compensate a decrease in holding force when the ferrite magnet is selected and hence to obtain the efficiency equal to or more than in the related art.

As the configuration of the axial gap motor, a combination such as a one-rotor/two-stator type, a two-rotor/one-stator type, and a one-rotor/one-stator type is known.

Patent Document 1 below discloses an axial gap motor (one rotor/one stator type) by continuously winding four same phase coils and connecting by the Y-connection. Here, since the number of connection points are decreased by the continuous winding, the motor is decreased in cost. Further, a jumper wire connecting the coils is integrated at the inner diameter side of the coil, the outer diameter side of the coil is used as a free space, and the outer diameter side of the coil is connected to a motor housing so as to improve a cooling performance.

CITATION LIST

Patent Document

Patent Document 1: JP 2008-172859 A

SUMMARY OF INVENTION

Technical Problem

However, in the above-described configuration disclosed in Patent Document 1, when the insulated conductor wire is highly densely wound so as to improve the occupation ratio and the continuously wound coil is formed while the jumper wire protrudes from the coil, the distance between a rotor shaft and the jumper wire is shortened. As a result, a problem arises in that a spatial insulation distance cannot be ensured.

Here, an object of the invention is to provide an axial gap motor capable of realizing low cost and high output without causing a jumper wire of a continuously wound coil obtained by highly densely winding an insulated conductor wire to protrude from the coil and a method for manufacturing a winding thereof.

Solution to Problem

Here, in order to attain the above-described object, the invention provides an axial gap motor including: a stator which is obtained by disposing a plurality of coils in a ring shape; and a rotor which is rotatably attached so as to face one or both principal surfaces of the stator and includes a plurality of permanent magnets corresponding to the plurality of coils of the stator, wherein each of the plurality of coils constituting the stator is formed by continuously winding one or more insulated conductor wires as coil wires around two or more separation cores, wherein when a core lamination thickness is indicated by "L1'" and a radial length of each coil is indicated by "L2", a relation of L2<L1' is satisfied, and wherein in each coil, a length of a jumper wire of the insulated conductor wire continuously wound on the two or more separation cores is equal to the radial length "L2" of the coil.

Further, in order to attain the above-described object, the invention provides a coil manufacturing method of manufacturing a plurality of coils constituting a stator of an axial gap motor including the stator obtained by disposing the plurality of coils in a ring shape and a rotor rotatably attached so as to face one or both principal surfaces of the stator and including a plurality of permanent magnets corresponding to the plurality of coils of the stator, each of the plurality of coils constituting the stator being formed by continuously winding one or more insulated conductor wires as coil wires around two or more separation cores, a relation of L2<L1' being satisfied when a core lamination thickness is indicated by "L1'" and a radial length of each coil is indicated by "L2", the coil manufacturing method including: coaxially disposing bobbins of two or more separation cores constituting each coil in series and performing a winding operation by a coil winder; and forming a continuously wound coil by forming a jumper wire by inclining a winding end wire of each coil and a winding start wire of the next coil toward the vicinity of an intermediate portion of the coil winder and turning up the adjacent coils by about 90° by using the jumper wire as a reference after the continuously wound coil is wound.

Advantageous Effects of Invention

According to the above-described invention, since the insulated conductor wire is highly densely wound so as to improve the occupation ratio, it is possible to manufacture the continuously wound coil so that the jumper wire does not protrude from the coil (the extra jumper wire length becomes 0 mm). Further, since the length of the jumper wire can be adjusted regardless of the core lamination thickness even when the core lamination thickness of the stator core is long, it is possible to provide the axial gap motor capable of realizing low cost (small connection points) and high output characteristics (high occupation ratio) and the method for manufacturing a winding thereof.

DESCRIPTION OF EMBODIMENTS

Hereinafter, an embodiment of the invention will be described with reference to the accompanying drawings.

First Embodiment

Figure 1:
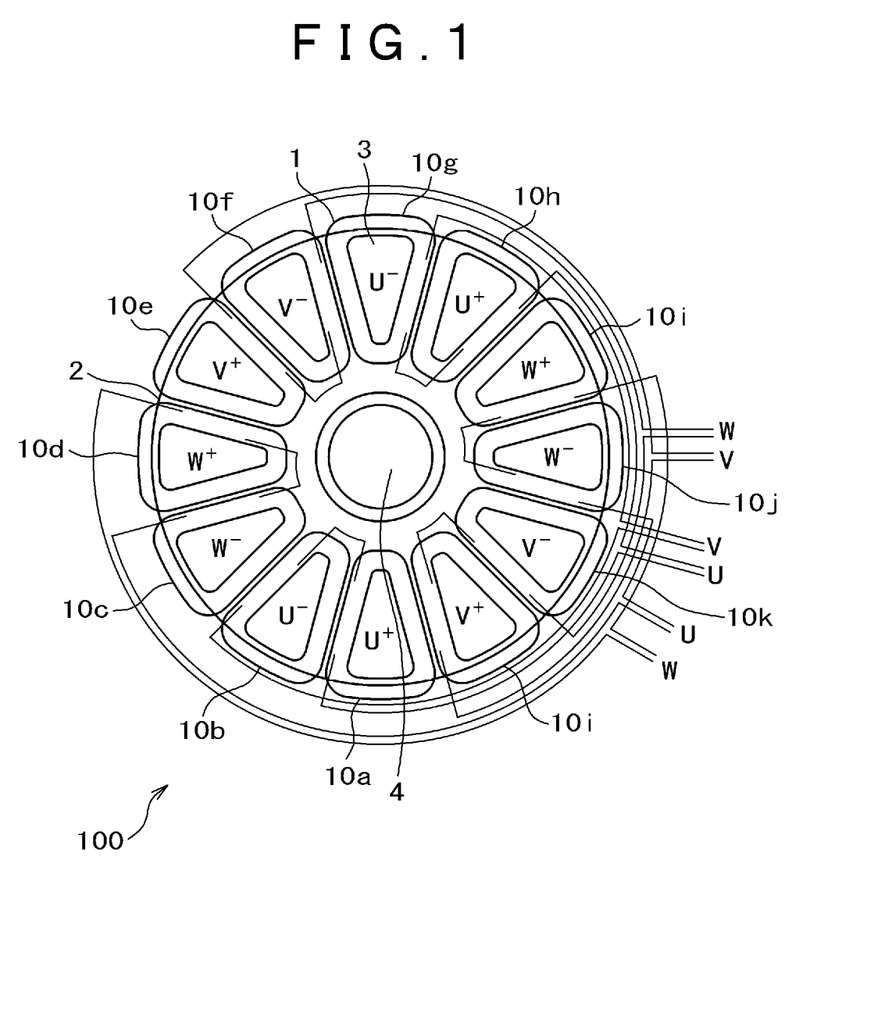
FIG. 1 is a schematic diagram illustrating the arrangement of a jumper wire and a lead wire of each phase coil of a 12-slot axial gap motor as an embodiment of the invention.

FIG. 1 is a schematic diagram illustrating the arrangement of a jumper wire and a lead wire of each phase coil of a 12-slot axial gap motor as an embodiment of the invention. Here, the "jumper wire" is defined as a part of an insulated conductor wire connecting the adjacent coils of the continuously wound coils (in FIG. 1, for example, two continuously wound coils of "U+" and "U−"). Further, the "lead wire" is defined as a part of an insulated conductor wire located at a winding start side or a winding end side of a coil and used in the so-called wiring of a motor.

In the axial gap motor 100, for example, a plurality of coils formed by continuously winding an insulated conductor wire around a separation core (an iron core) 3 formed by laminating a silicon steel plate are prepared, the coils are disposed in a ring shape so as to form, for example, a disc-shaped stator 1, and a rotor 2 is rotatably disposed so as to face both or one of upper and lower principal surfaces of the stator 1. Here, as apparent from the drawings, the iron core 3 has a trapezoidal cross-sectional shape, but the invention is not limited thereto. In addition, for example, the cross-sectional shape can be, of course, appropriately changed into a triangular shape or a square shape.

Further, the rotor 2 is connected to a rotation shaft 4 (more specifically, a disc-shaped member (not shown) connected to a rotation shaft) disposed at the center of the motor, and is disposed so as to be separated from the stator 1 by a predetermined gap.

Further, although not shown in the drawings, a plurality of magnets (in this example, ferrite magnets) are disposed in the circumferential direction so that N and S poles are changed alternatively in the facing surface (the ring-shaped surface) of the rotor 2 with respect to the stator 1. Further, the axial gap motor 100 to be described later is an example and, of course, the number of the coils of each phase, that is, the number of slots of each phase can be appropriately changed.

Further, in FIG. 1, two U-phase coils 10a and 10b are continuously wound through the jumper wire. In this example, the coil winding direction indicates the clockwise rotation in the case of "U+" and indicates the counter-clockwise rotation in the case of "U−". Then, all jumper wires are integrated at the inner diameter side of the coil. Further, the lead wire is drawn between the outer diameter side of the coil and the housing and is used in the wiring of the motor. In addition, the other pair of two U-phase coils 10g and 10h, two pairs (four) of W-phase coils 10c, 10d, 10i, and 10j, and two pairs (four) of V-phase coils 10e, 10f, 10k, and 10l are also continuously wound as described above, and the winding direction of continuous winding and the arrangement of the jumper wire are similar to the above-described examples.

Figure 2:
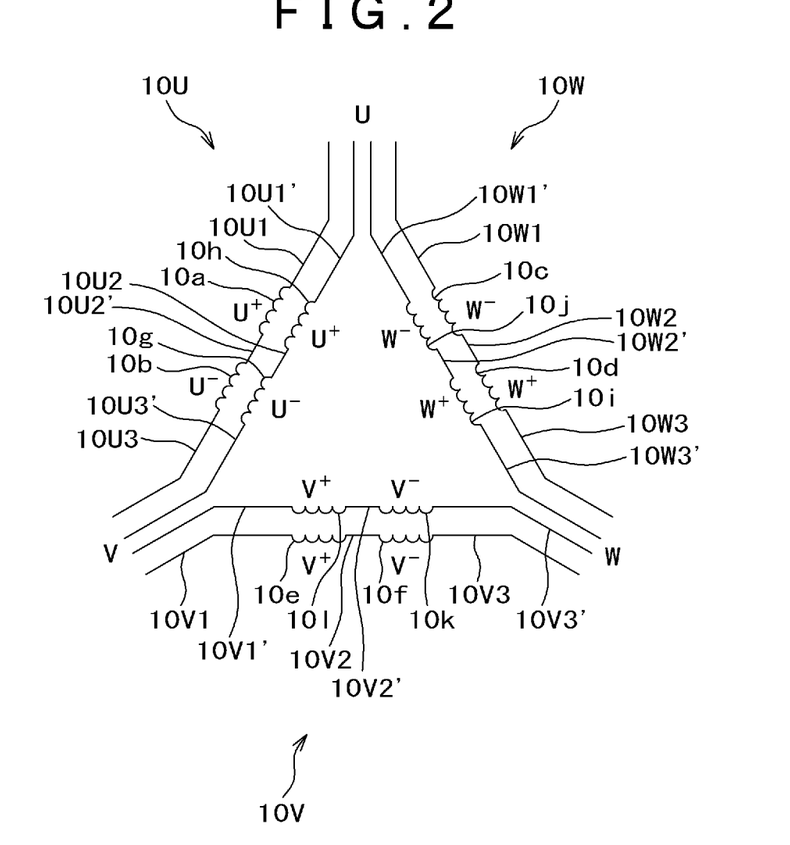
FIG. 2 is a circuit diagram illustrating the wire connection of each phase coil of the 12-slot axial gap motor.

FIG. 2 is a circuit diagram illustrating a wire connection state of the stator 1 described in the above-described winding structure of the axial gap motor 100 of the invention. That is, as apparent from the drawings, one of the U-phase coils 10U is formed by connecting a lead wire 10U1, the coil 10a, jumper wires 10U2 and 10b, and a lead wire 10U3 in series to one another. Further, the other coil is also formed by connecting a lead wire 10U1', the coil 10h, jumper wires 10U2' and 10g, and a lead wire 10U3' in series to one another. Further, the configurations of the other phase coils, that is, the V-phase coil 10V and the W-phase coil 10W are the same as that of the U-phase coil 10U in addition to the coil winding direction.

That is, the axial gap motor 100 of the embodiment is formed by connecting so-called two serial/two parallel Δ connection using six pairs of two continuously wound coils.

Figure 3:
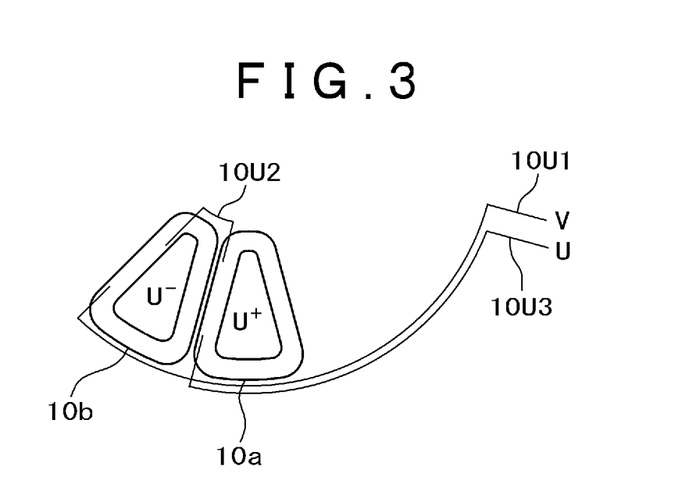
FIG. 3 is a schematic diagram illustrating the arrangement of two U-phase continuously wound coils in the 12-slot axial gap motor.
Figure 4:
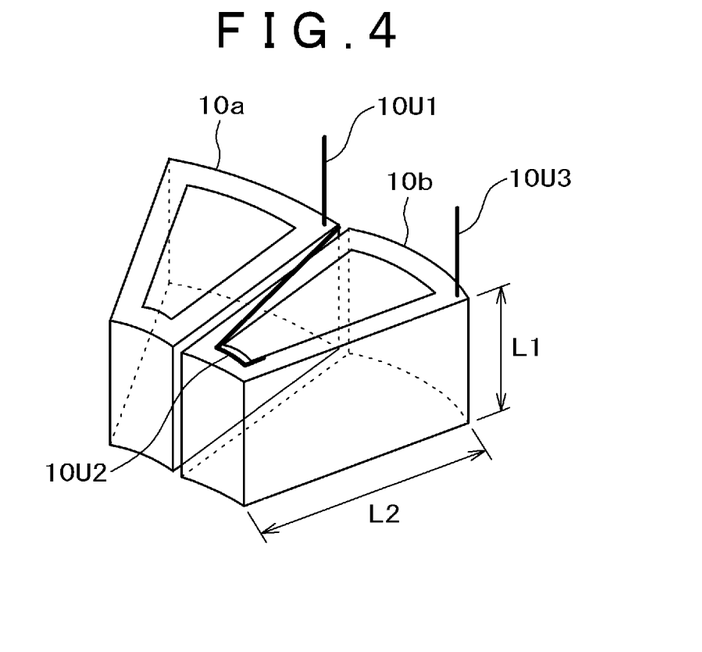
FIG. 4 a partially enlarged perspective view specifically illustrating the winding structures of two U-phase continuously wound coils of the axial gap motor.

Further, in order to more specifically describe the structure and the arrangement of each of two continuously wound coils, the U-phase coil 10U is used as an example. Here, FIG. 3 is a schematic diagram thereof and FIG. 4 is an enlarged perspective view thereof. Of course, the V-phase coil 10V or the W-phase coil 10W also have the same structure and arrangement. Further, the coil herein is obtained by winding one insulated conductor wire, but the invention is not limited thereto. Instead of this configuration, the coil may be, of course, obtained by winding two or more wires.

<Coil Manufacturing Method>

Here, when the core lamination thickness of the stator 1 is indicated by "L1" and the radial length of the coil is indicated by "L2", a relation of L1<L2 is satisfied (the detailed description will be made below also) as apparent from FIG. 4. Here, when an ideal jumper wire is disposed so that the jumper wire does not protrude from the coil (that is, the extra jumper wire length becomes 0 mm), the jumper wire 10U2 indicated by a bold line of FIG. 4 is obtained.

When the ideal jumper wire can be disposed in this way, the distance between the rotor shaft and the jumper wire is long, and hence a spatial insulation distance can be ensured sufficiently.

<General Winding Method>

Figure 5:
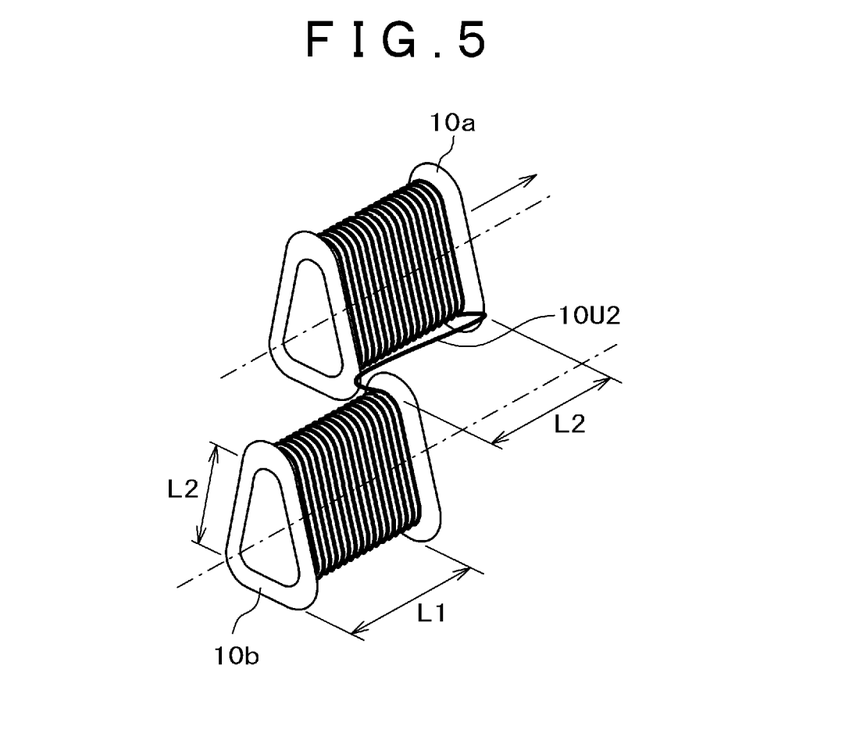
FIG. 5 is a perspective view illustrating a general winding method for two continuously wound coils used for the comparison with the invention.

FIG. 5 illustrates a general winding method for two continuously wound coils. Generally, as shown in the drawing, two coil bobbins 10a and 10b are disposed in the state of being aligned in a line in the lateral direction so that the rotation shafts (each indicated by one dotted chain line in the drawing) are adjacently parallel to each other, and these coil bobbins are respectively placed on an advancing and retracting mechanism (not shown) driven in the front and back direction (a direction indicated by one dotted chain line). Further, FIG. 5 illustrates a state where a winding operation is completely performed even in the second core. That is, a wiring operation performed on two bobbins 10a and 10b ends. Referring to this state as an example, a nozzle (not shown) supplying an insulated conductor wire includes a three-axis moving mechanism and can form a jumper wire between coils. However, in order to simply describe this example, it is assumed that the nozzle is fixed and the entire winding part including the other work is rotated for the winding operation. Of course, it is needless to mention that two continuously wound coils can be formed similarly even in the method of moving the nozzle (so as to rotate around the bobbin).

Incidentally, here, the first core (the bobbin 10a) is retracted (see the arrow of the drawing) as shown in the drawing and the second core (the bobbin 10b) advances by a distance capable of ensuring the winding path (that is, a state where any inconvenience does not occur when the insulated conductor wire is wound around the second core (the bobbin 10b)) immediately after the winding operation of the second core (the bobbin 10b) ends. At this time, the length "L2" of the jumper wire 10U2 is equal to or longer than the core lamination thickness "L1".

Here, when the radial length "L2" in a plane orthogonal to the one dotted chain line of the coil (the bobbin) is equal to the length "L2" of the jumper wire, the jumper wire 10U2 has an ideal arrangement as shown in FIG. 4.

Figure 6:
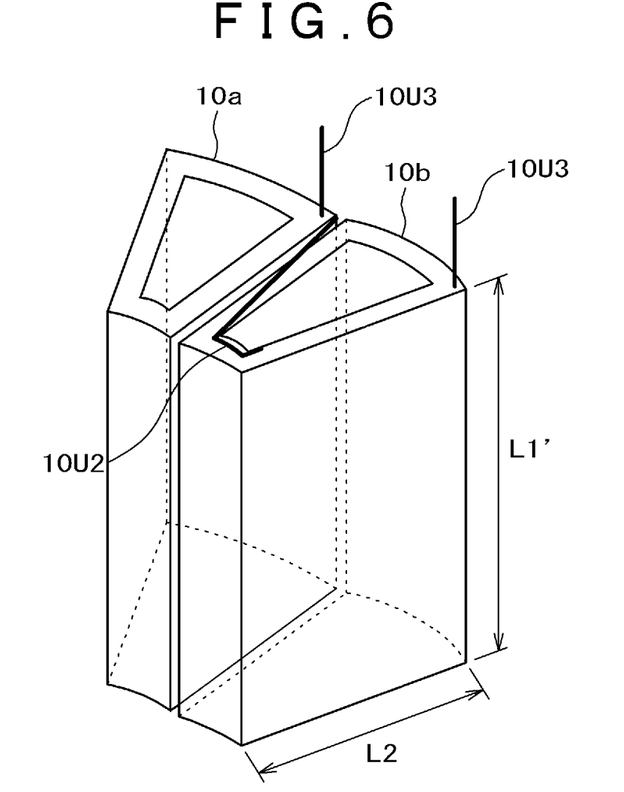
FIG. 6 is a perspective view illustrating the ideal arrangement and configuration of two continuously wound coils in which a core lamination thickness is longer than the radial length of a coil manufactured by the invention.

However, for example, as shown in FIG. 6, when the core lamination thickness "L1'" and the radial length "L2" of the coil have a relation of L2<L1', the second core (the bobbin) needs to move by a stroke equal to or larger than the core lamination thickness "L1'", and hence the length of the jumper wire 10U2 becomes equal to or larger than at least the core lamination thickness "L1'". That is, the jumper wire 10U2 protrudes from the coil (the bobbin), and hence the distance between the rotor shaft and the jumper wire is shortened as described above. As a result, a problem arises in that the spatial insulation distance cannot be ensured.

Here, the invention is made to solve the above-described problems and provides a winding method capable of obtaining the jumper wire 10U2 having an ideal length as shown in FIG. 6 regardless of the relation between the core lamination thickness and the radial length of the coil. An example is shown in FIG. 7.

<Winding Method of Invention>

Figure 7:
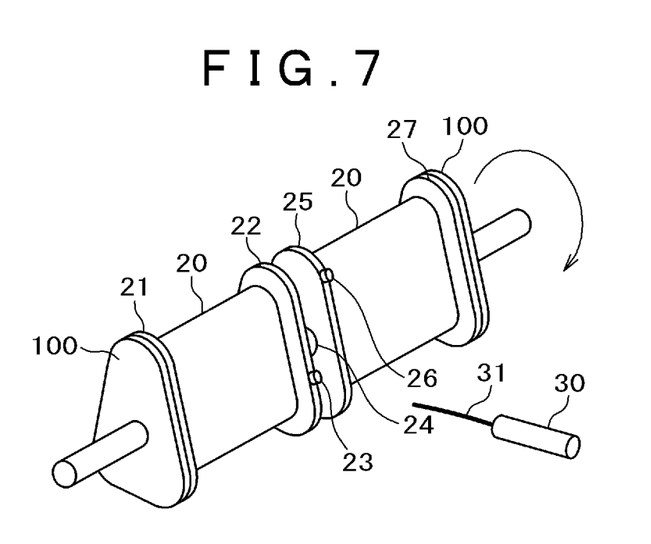
FIG. 7 is a perspective view illustrating a winding method for a coil of the invention.

As shown in FIG. 7, two winding bobbins 20 are coaxially disposed in a winding jig (not shown). Further, even in this example, a nozzle 30 which supplies an insulated conductor wire 31 includes a three-axis moving mechanism, and a jumper wire can be formed between the coils. However, a winding operation herein is performed in a manner such that the entire winding part including a work is rotated (see the arrow of the drawing).

Two winding bobbins 20 are respectively formed so as to be symmetrical to each other. Specifically, the front winding bobbin 20 includes front and rear winding frames 21 and 22. Further, a fixed pin 23 for fixing the insulated conductor wire is provided in a part of the outer periphery of the rear winding frame 22. Meanwhile, the rear winding bobbin 20 includes front and rear winding frames 25 and 27, and a fixed pin 26 for fixing the insulated conductor wire is provided in a part of the outer periphery of the front winding frame 25. Further, the winding frames 21, 22, 25, and 27 are removably attached to the corresponding winding bobbins 20, and an intermediate ring 24 is provided between two winding bobbins 20.

As shown in FIG. 7, two winding bobbins 20 are nipped by a pair of holding rotating jigs 100 while the intermediate ring 24 is attached therebetween. Further, a winding operation may be performed while the iron core 3 is inserted into the winding bobbin 20. Alternatively, the iron core may be inserted into the winding bobbin 20 after the wiring operation. In this example, as in the latter case, a description will be made on the assumption that the iron core 3 is inserted into the coil bobbin 20 after the wiring operation. Further, the fixed pins 23 and 26 disposed at the side surfaces of the winding frame 22 and the winding frame 25 are used as jumper wire positioning jigs to be described later.

Figure 8:
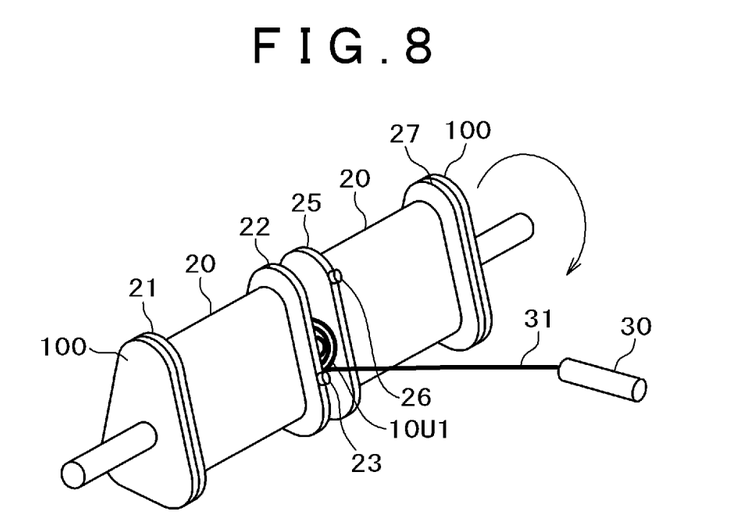
FIG. 8 is a perspective view illustrating a winding method (a first step) for the coil of the invention.

FIG. 8 illustrates a first step of the winding operation (the method for manufacturing a winding). First, the nozzle 30 is moved while the holding rotating jig 100 is rotated (see the arrow of the drawing), the insulated conductor wire 31 is hooked to a notch portion (not shown) of the winding frame 20, and then the lead wire 10U1 is wound on the intermediate ring 24.

Figure 9:
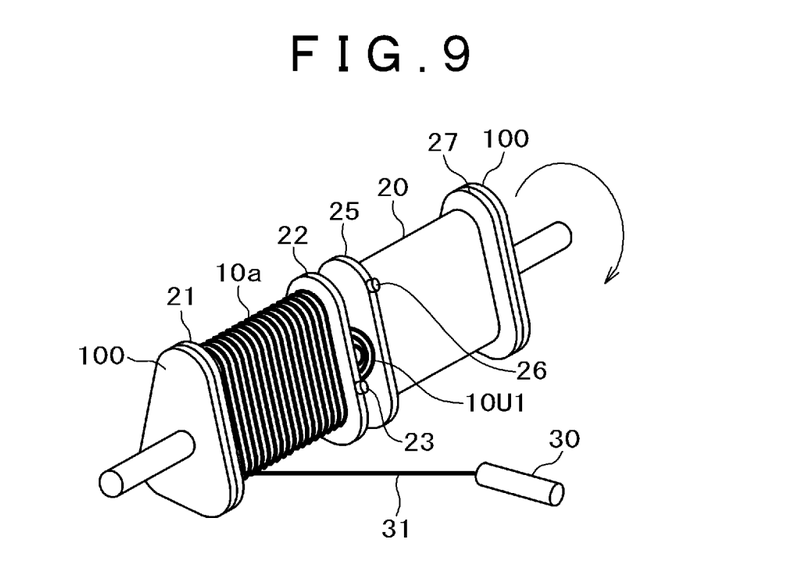
FIG. 9 is a perspective view illustrating a winding method (a second step) for the coil of the invention.

Next, FIG. 9 illustrates a second step of the winding operation. Here, the coil 10a is wound while the nozzle 30 is moved after the lead wire 10U1 is formed. Further, even at this time, the holding rotating jig 100 is rotated (see the arrow of the drawing).

Figure 10:
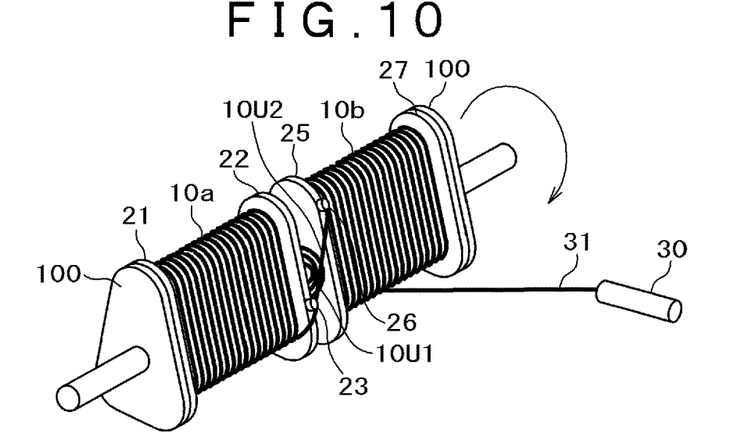
FIG. 10 is a perspective view illustrating a winding method (a third step) for the coil of the invention.

FIG. 10 illustrates a third step of the winding operation. After the coil 10a is completely wound, the jumper wire 10U2 is formed and the coil 10b is wound on the next winding bobbin 20.

Here, since the jumper wire 10U2 is positioned by the fixed pins 23 and 26 formed in the outer peripheries of the winding frames 22 and 25 of the bobbins 20, the jumper wire is formed obliquely as shown in the drawing.

Figure 11:
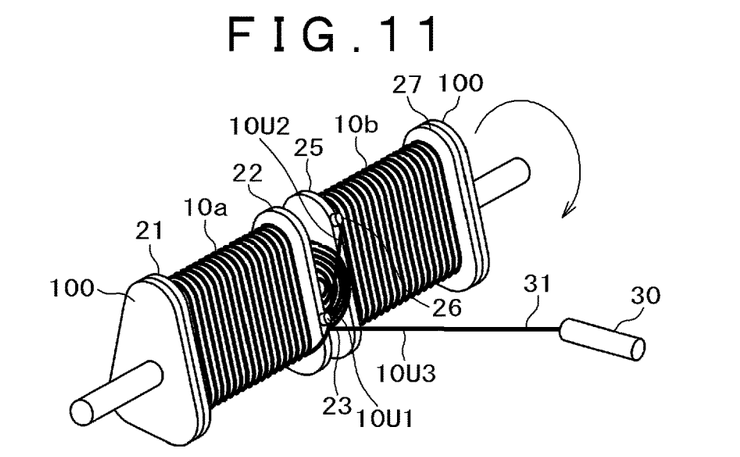
FIG. 11 is a perspective view illustrating a winding method (a fourth step) for the coil of the invention.

Subsequently, FIG. 11 illustrates a fourth step of the winding operation. In this step, after the winding operation of the coil 10b is completed, the nozzle 30 is moved to the center (that is, the position of the intermediate ring 24) of a winding jig, and the lead wire 10U3 is wound on the intermediate ring 24.

Figure 12:
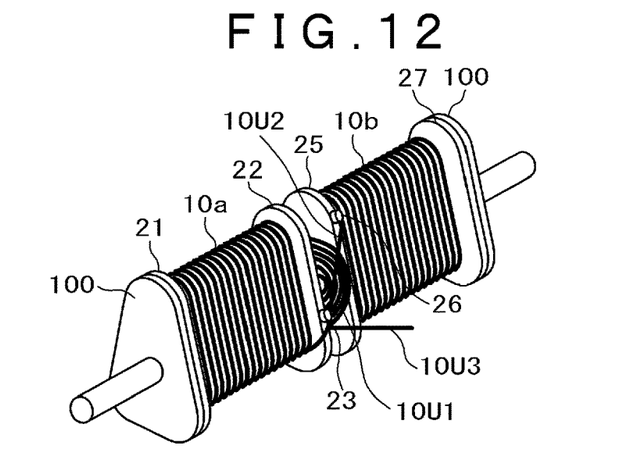
FIG. 12 is a perspective view illustrating a winding method (a fifth step) for the coil of the invention.

Further, FIG. 12 illustrates a fifth step of the winding operation. In this step, the lead wire 10U3 is cut by, for example, a nipper or the like, and hence the original shapes of two continuously wound coils are formed.

Figure 13:
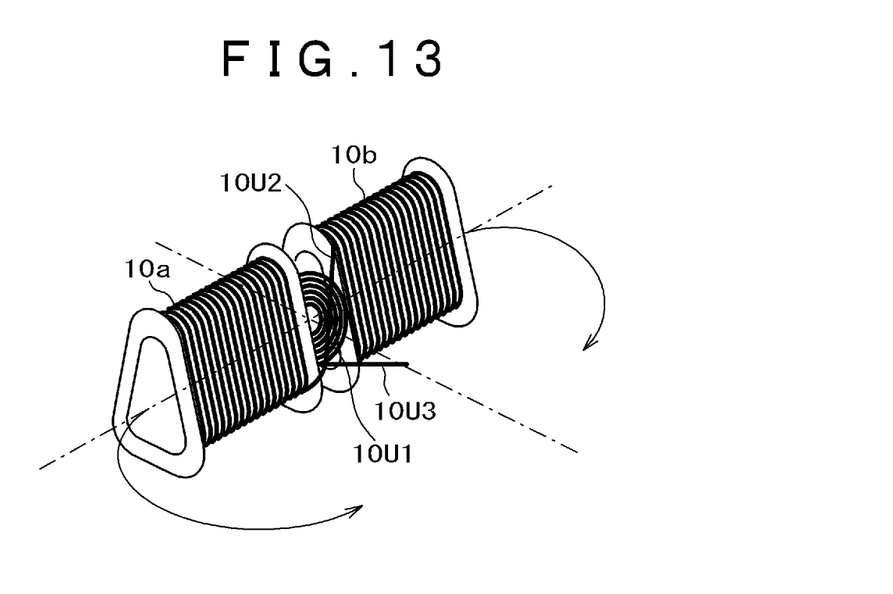
FIG. 13 is a perspective view illustrating a winding method (a sixth step) for the coil of the invention.

Then, FIG. 13 illustrates a sixth step of the winding operation. In this step, the lead wire 10U3 is wound and separated from the intermediate ring 24, and the winding frame 21, the winding frame 22, the intermediate ring 24, the winding frame 25, and the winding frame 27 are separated from the wound coils 10a and 10b. Further, this drawing illustrates the appearance of the coils 10a and 10b from which the winding frames or the intermediate ring are separated. Subsequently, two continuously wound coils 10a and 10b are turned back by about 90° as indicated by the arrow of the drawing by using the jumper wire 10U2 as a reference.

Figure 14:
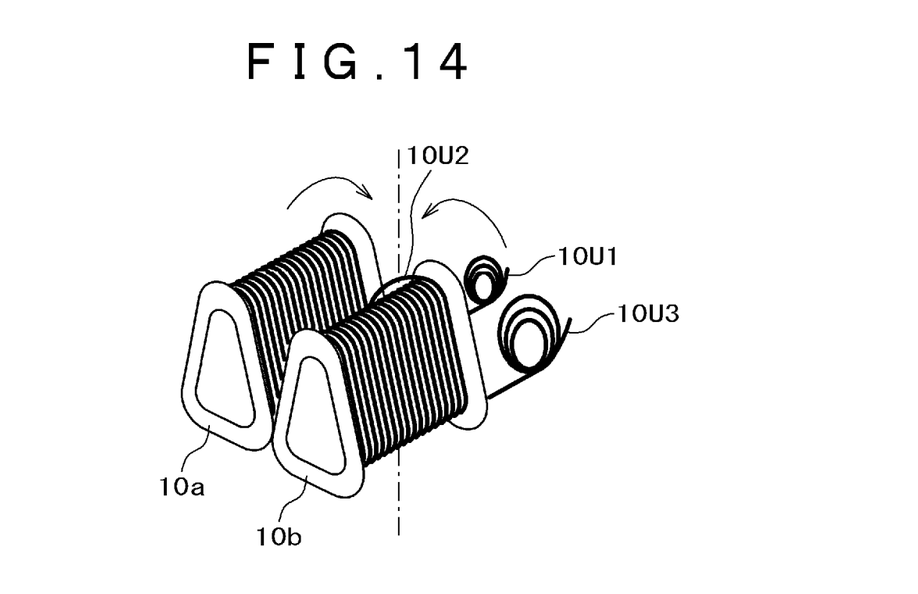
FIG. 14 is a perspective view illustrating a winding method (a seventh step) for the coil of the invention.

Finally, FIG. 14 illustrates a seventh step of the winding operation. This drawing illustrates a state where two continuously wound coils 10a and 10b are turned back by about 90° by using the jumper wire 10U2 as a reference. Subsequently, when the coils 10a and 10b are rotated (see the arrow of the drawing) so that the apex portions of the trapezoidal coils approach each other by using the intermediate portion (that is, the jumper wire 10U2) as a reference. Then, for example, as shown in FIG. 6, the jumper wire 10U2 ideally disposed is formed so that the jumper wire does not protrude from the coil (the extra jumper wire length becomes 0 mm).

Figure 15:
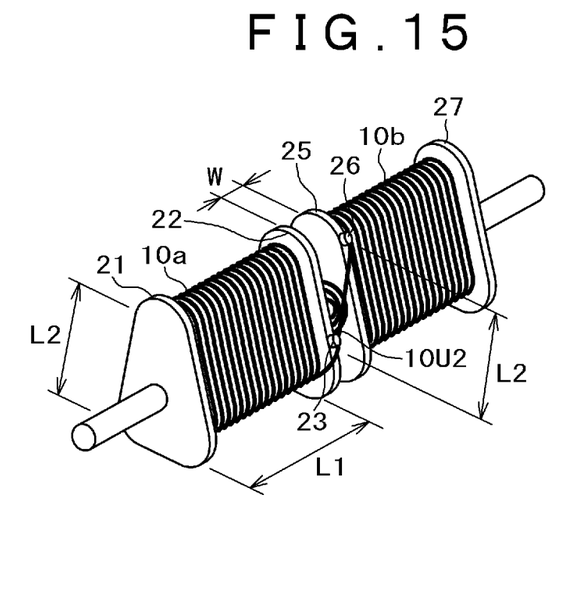
FIG. 15 is a perspective view illustrating two ideal continuously wound coils obtained even when the coil is manufactured by the winding method so that the core lamination thickness is longer than the radial length of the coil.

Here, in the fifth step of the winding operation shown in FIG. 12, for example, as shown in FIG. 15, when the core lamination thickness is indicated by "L1" and the radial length of the coil is indicated by "L2", a relation of L2<L1 is satisfied.

Here, in the above-described winding method of realizing the ideal length of the jumper wire 10U2, the jumper wire 10U2 is obliquely formed in that the jumper wire is positioned by the fixed pins 23 and 26. Here, when the distance "W" between the winding frame 22 and the winding frame 25 and also between the fixed pins 23 and 26 disposed at the side surfaces of the winding frame 22 and the winding frame 25 is adjusted, the length of the jumper wire 10U2 positioned by the fixed pins 23 and 26 can be equal to the radial length L2 of the coil. That is, the jumper wire 10U2 ideally disposed is formed so that the jumper wire does not protrude from the coil (the extra jumper wire length becomes 0 mm).

Then, when the winding manufactured as described above is formed as the continuously wound coil having each phase in the axial gap motor, the occupation ratio of the winding increases, and hence the continuously wound coil can be manufactured so that the jumper wire does not protrude from the coil (the extra jumper wire length becomes 0 mm). For this reason, it is possible to realize the axial gap motor having low cost (small connection points) and high output characteristics (high occupation ratio).

Further, according to the method for manufacturing a winding, even when the core lamination thickness of the stator core is long, the length of the jumper wire can be appropriately adjusted regardless of the core lamination thickness, and hence the continuously wound coil can be manufactured so that the jumper wire does not protrude from the coil (the extra jumper wire length becomes 0 mm). Thus, it is possible to realize the axial gap motor having low cost (small connection points) and high output characteristics (high occupation ratio).

Figure 16:
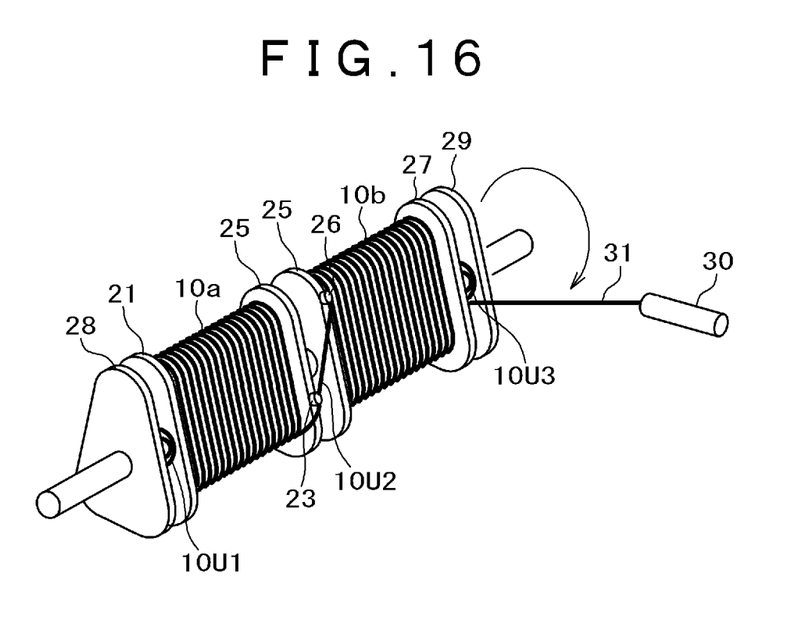
FIG. 16 is a perspective view illustrating a winding method for a case where the coil is manufactured by the winding method so that the winding number is odd.

In addition, the above-described coil winding method corresponds to a case where the winding number of the coil is even. Finally, the winding method for a case where the winding number of the coil is odd is shown in FIG. 16.

As apparent from the drawings, winding frames 28 and 29 may be further provided at the left and right sides of the winding jig shown in FIG. 7. Then, the lead wires 10U1 and 10U3 are respectively wound around the portions adjacent to the coils 10a and 10b. Further, even in a case where the winding number of the coil is odd, the method of forming the jumper wire 10U2 is the same as in a case where the winding number of the coil is even. Thus, even when the winding number of the coil is odd, the jumper wire 10U2 ideally disposed can be formed so that the jumper wire does not protrude from the coil (the extra jumper wire length becomes 0 mm).

LIST OF REFERENCE SIGNS

1: stator
2: rotor
3: iron core
10a to 10l: coil
10U: U-phase coil
10V: V-phase coil
10W: W-phase coil
10U1, 10U1': lead wire
10U2, 10U2': jumper wire
10U3, 10U3': lead wire
10V1, 10V1': lead wire
10V2, 10V2': jumper wire
10V3, 10V3': lead wire
10W1, 10W1': lead wire
10W2, 10W2': jumper wire
10W3, 10W3': lead wire
21, 22, 25, 27: winding frame
24: intermediate ring
23, 26: fixed pin
28, 29: winding frame
30: nozzle
31: insulated conductor wire
100: axial gap motor

The invention claimed is:

1. An axial gap motor comprising:
a stator which is obtained by disposing a plurality of coils in a ring shape; and
a rotor which is rotatably attached so as to face one or both principal surfaces of the stator and includes a plurality of permanent magnets corresponding to the plurality of coils of the stator,
wherein each of the plurality of coils constituting the stator is formed by continuously winding one or more insulated conductor wires as coil wires around two or more separation cores,
wherein when a core lamination thickness is indicated by "L1'" and a radial length of each coil is indicated by "L2", a relation of L2<L1' is satisfied, and
wherein in each coil, a total length of a jumper wire of the insulated conductor wire which is continuously wound on the two or more separation cores is equal to the radial length "L2" of the coil.

2. The axial gap motor according to claim 1, wherein the coil has a triangular or trapezoidal cross-sectional shape.

3. The axial gap motor according to claim 1, wherein the permanent magnet constituting the rotor is a ferrite magnet.

4. The axial gap motor according to claim 3, wherein the continuously wound coils are connected by connecting two serial/two parallel Δ connection.

* * * * *